United States Patent
Haw et al.

(10) Patent No.: US 9,704,290 B2
(45) Date of Patent: Jul. 11, 2017

(54) DEEP IMAGE IDENTIFIERS

(71) Applicant: LUCASFILM ENTERTAINMENT COMPANY, LTD., San Francisco, CA (US)

(72) Inventors: Shijun Haw, Singapore (SG); Xavier Bernasconi, Shanghai (CN)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 0 days.

(21) Appl. No.: 14/502,439

(22) Filed: Sep. 30, 2014

(65) Prior Publication Data

US 2016/0093112 A1 Mar. 31, 2016

(51) Int. Cl.
*G06T 11/60* (2006.01)
*G06T 17/00* (2006.01)

(52) U.S. Cl.
CPC ............ *G06T 17/005* (2013.01); *G06T 11/60* (2013.01); *G06T 2210/61* (2013.01)

(58) Field of Classification Search
None
See application file for complete search history.

(56) References Cited

PUBLICATIONS

Heinen, Patrick. "Deep image compositing in a modern visual effects pipeline." language (Mar. 2013).*
Ye, Zhaoxin. "Volumetric Cloud Rendering: An Animation of Clouds." (Sep. 2014).*
Museth, Ken. "VDB: High-resolution sparse volumes with dynamic topology." ACM Transactions on Graphics (TOG) 32.3 (2013): 27.*
Heckenberg, Daniel, et al. "Deep compositing." (2010).*
Lokovic, Tom, and Eric Veach. "Deep shadow maps." Proceedings of the 27th annual conference on Computer graphics and interactive techniques. ACM Press/Addison-Wesley Publishing Co., 2000.*
Nadeau, David R. "Volume scene graphs." Proceedings of the 2000 IEEE symposium on Volume visualization. ACM, 2000.*
Kainz, Florian, and Rod Bogart. "Technical introduction to OpenEXR." Industrial light and magic (2009).*
Wickes, Roger D. "Manipulating Images." Foundation Blender Compositing(2009): 313-348.*

* cited by examiner

*Primary Examiner* — Ryan M Gray
(74) *Attorney, Agent, or Firm* — Kilpatrick Townsend & Stockton LLP

(57) ABSTRACT

A method may include receiving a plurality of objects from a 3-D virtual scene. The plurality of objects may be arranged in a hierarchy. The method may also include generating a plurality of identifiers for the plurality of objects. The plurality of identifiers may include a first identifier for a first object in the plurality of objects, and the identifier may be generated based on a position of the first object in the hierarchy. The method may additionally include performing a rendering operation on the plurality of objects to generate a deep image. The deep image may include a plurality of samples that correspond to the first object. The method may further include propagating the plurality of identifiers through the rendering operation such that each of the plurality of samples in the deep image that correspond to the first object are associated with the identifier.

15 Claims, 11 Drawing Sheets

DEEP IMAGE IDENTIFIERS

BACKGROUND

In computer graphics, compositing includes combining visual effects from separate sources into single images to create the illusion that all of those elements are part of the same virtual scene. Generally, elements of a three-dimensional (3-D) virtual scene are processed by a renderer to produce a two-dimensional (2-D) representation of the scene. The renderer can produce a deep image that includes multiple samples per pixel. Advanced techniques can often be used for high-fidelity image compositing that utilize this deep image. Termed "deep compositing," the compositing operation can accept deep image formats (such as deep OpenEXR 2.0 images) in order to enable advanced operations, such as color correction and volumetric compositing without holdouts.

BRIEF SUMMARY

In some embodiments, a method may include receiving a plurality of objects from a 3-D virtual scene. The plurality of objects may be arranged in a hierarchy. The method may also include generating a plurality of identifiers for the plurality of objects. The plurality of identifiers may include a first identifier for a first object in the plurality of objects, and the identifier may be generated based on a position of the first object in the hierarchy. The method may additionally include performing a rendering operation on the plurality of objects to generate a deep image. The deep image may include a plurality of samples that correspond to the first object. The method may further include propagating the plurality of identifiers through the rendering operation such that each of the plurality of samples in the deep image that correspond to the first object are associated with the identifier.

In some embodiments, a system may include one or more processors and one or more memory devices having instructions stored thereon that, when executed by the one or more processors, cause the one or more processors to perform operations including receiving a plurality of objects from a 3-D virtual scene. The plurality of objects may be arranged in a hierarchy. The operations may also include generating a plurality of identifiers for the plurality of objects. The plurality of identifiers may include a first identifier for a first object in the plurality of objects, and the identifier may be generated based on a position of the first object in the hierarchy. The operations may additionally include performing a rendering operation on the plurality of objects to generate a deep image. The deep image may include a plurality of samples that correspond to the first object. The operations may further include propagating the plurality of identifiers through the rendering operation such that each of the plurality of samples in the deep image that correspond to the first object are associated with the identifier.

In some embodiments, a non-transitory computer-readable medium may include instructions that, when executed by one or more processors, cause the one or more processors to perform operations including receiving a plurality of objects from a 3-D virtual scene. The plurality of objects may be arranged in a hierarchy. The operations may also include generating a plurality of identifiers for the plurality of objects. The plurality of identifiers may include a first identifier for a first object in the plurality of objects, and the identifier may be generated based on a position of the first object in the hierarchy. The operations may additionally include performing a rendering operation on the plurality of objects to generate a deep image. The deep image may include a plurality of samples that correspond to the first object. The operations may further include propagating the plurality of identifiers through the rendering operation such that each of the plurality of samples in the deep image that correspond to the first object are associated with the identifier.

Some embodiments may include one or more of the following features in any combination and without limitation. The method/operations may include receiving a selection of the identifier after performing the rendering operation, selecting the plurality of samples in the deep image that are associated with the identifier, and performing a post-render operation on the plurality of samples. The post-render operation may include generating a matte image. The identifier may include a bit field divided into a plurality of partitions, and each of the plurality of partitions may be associated with a different level in the hierarchy. The plurality of partitions may include a first partition associated with an instance of the first object, and the plurality of partitions may include a second partition associated with a parent of the first object. The method/operations may also include receiving a selection of the identifier after performing the rendering operation, determining one or more identifiers associated with parent objects of the first object in the hierarchy, and selecting one or more samples in the deep image that are associated with the one or more identifiers. Generating the plurality of identifiers for the plurality of objects may include using a hash function on the first object to generate a number, determining a number of bits to be used to represent the number where the number of bits is based on a number of objects in the plurality of objects, and representing the number using the determined number of bits in the identifier. The plurality of objects may be arranged in the hierarchy as part of a scene graph. The method/operations may additionally include exporting the hierarchy from a pre-rendering process to a post-rendering process.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1A:
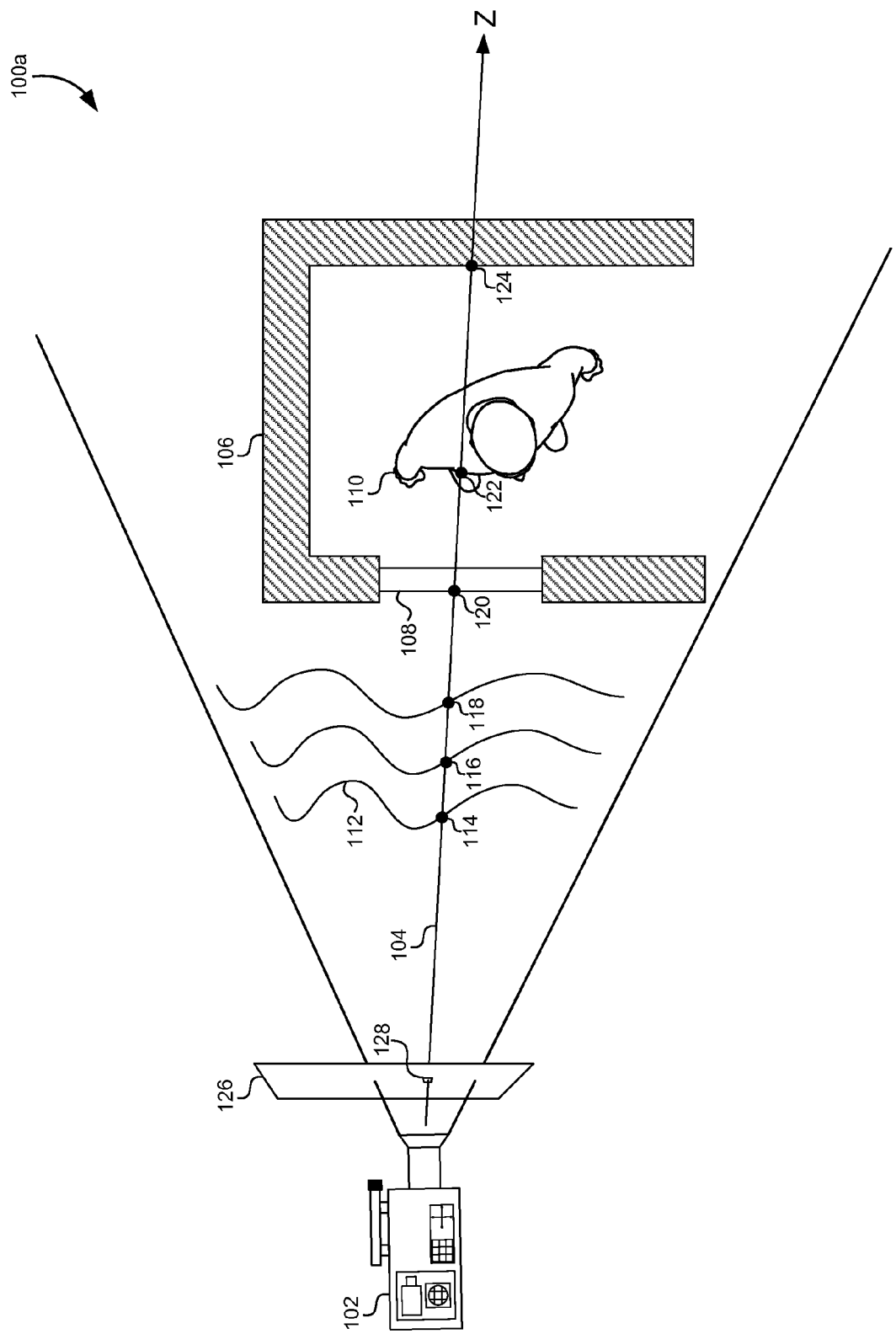
FIG. 1A illustrates a virtual camera capturing a deep image in a virtual 3-D environment, according to some embodiments.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Described herein are embodiments for encoding information about the structure and makeup of a scene graph in identifiers that can be propagated through the rendering process as part of a deep image and decoded during compositing. When building a 3-D virtual scene, each object or primitive in the scene can be assigned an identifier. The identifier may be generated based on a location of the primitive in a scene graph hierarchy. The identifier may also linked together different assets, geometries, surfaces, etc., in the pre-rendered scene. Pre-rendering software tools that are used to construct the 3-D virtual scene can utilize a script or macro that automatically generates these identifiers for each primitive in the scene. The renderer can propagate these identifiers through the rendering process such that each sample may be associated with a primitive in the scene by virtue of the identifiers. The renderer can include a display driver that formats the deep image output file using the identifiers. In the deep image, each sample can retain the identifier from its source primitive. Post-rendering operations, such as deep compositing operations, matte generation, recoloring operations, shading operations, compression operations, and so forth, may utilize these identifiers in the deep image to select samples belonging to the same or related primitives. Hierarchical information from the scene graph can also be used, such that child/parent primitives can also be selected. Deep compositing operations can then be performed on the selections that are available by virtue of the deep image identifiers.

During deep image compositing, compositors often require ways to identify and/or select regions of a 2-D image in order to adjust the image in various ways. The criteria for making selections often needs to include a broad set of conditions that may span different domains of the rendering pipeline, and which may include various combinations of such conditions. For example, a compositor may need to select an entire arm of an animated character. Because the arm of the character is built from many different primitive geometries, this selection may call for information about the way the animated character was built. In other words, selecting the arm of an animated character requires information that is included in a scene graph prior to rendering, but which is not represented by information in the rendered deep image. Other examples may include selecting a subset of surfaces that have the same surface texture as a particular character or element. There can also be endless combinations of textures, hierarchical relationships, and other relationships that are lost during the typical rendering process. The embodiments described herein allow users to select in the deep image by attribute and/or hierarchy relationship from the scene graph, and to use these selections to adjust the lighting on character elements, to generate matte images, to add visual effects such as motion blur, to compress deep images, and/or the like.

Prior to this disclosure, in order to make a selection during deep image compositing, another "round trip" through the rendering process was required. Because a compositor rarely knows ahead of time the intricacies involved in a rendered image, as well as what creative needs may arise in the resulting 2-D image, this render-to-order, on-demand process is both time-consuming and prone to repetition. In contrast to this process, the embodiments described herein provide a flexible and comprehensive methodology for assigning so-called deep identifiers to any and all geometric primitives prior to rendering. These deep identifiers can encode hierarchical, structural, and material-related information about the relationships in the 3-D virtual scene that can then be propagated through to the deep compositing operations.

FIG. 1A illustrates a virtual camera capturing a deep image in a virtual three-dimensional (3-D) environment, according to some embodiments. A 3-D virtual scene 100a can include many different objects. In the simplified example of FIG. 1A, the 3-D virtual scene 100a includes a structure 106, a human character 110, a window 108, and/or an environmental effect 112, such as fog, steam, mist, heat, radiation, and/or the like. In order to generate a 2-D view of the 3-D virtual scene 100a, a virtual camera 102 can be positioned in the 3-D virtual scene 100a. The virtual camera 102 can include a focal point that is projected onto a picture plane 126.

The picture plane 126 can be represented by a 2-D array of pixels. In order to determine the characteristics of each pixel, such as RGB color, the renderer can create one or more samples for each pixel. Generally, the renderer takes a view of a 3-D scene and performs graphical operations, such as shading, lighting, texturing, and/or the like. The renderer can then use techniques, such as scanline rendering, rasterization, ray casting, ray tracing, etc., to generate samples for each pixel. Instead of simply generating a single color for each pixel in the 2-D array, samples are generated because the rendering process is attempting to translate a continuous function from the virtual image space into a finite number of discrete pixels. In other words, a continuous image cannot display details, such as peaks or troughs in color or intensity that are smaller than a single pixel. Therefore, each surface projected onto the picture plane 126 may result in a plurality of samples. For example, some embodiments may use a 9×9 array of samples for each surface projected onto the picture plane 126. The samples can generally be averaged or otherwise combined together to form a single RGB color for each surface captured in each pixel for the final 2-D image.

Multiple samples for each pixel are also created because some surfaces in the 3-D virtual scene 100a may have varying levels of opacity. Thus, some objects in the 3-D virtual scene 100a may be somewhat transparent, allowing objects that would be occluded according to the view of the virtual camera 102 to be visible through the transparent objects in the foreground. In order to capture views of objects that are occluded by objects that are not fully opaque, samples can be stored for each level of depth as a ray projected from the pixel in the picture plane 126 passes through the 3-D virtual scene 100a. For exemplary purposes only, the depth from the perspective of the virtual camera 102 is referred to as a "Z" value, and the opacity of each surface is referred to as an "alpha" (a) value represented on a scale from 0.0 (fully transparent) to 1.0 (fully opaque).

By way of example, FIG. 1A illustrates a ray 104 traced through a pixel 128 of the picture plane 126. As the ray steps through the Z depth of the 3-D virtual scene 100a, it will encounter a number of objects with varying alpha levels. As the ray 104 steps through each layer of the environmental effect 112, each Z increment may include a new sample or set of samples. In this example, if the environmental effect 112 represents fog, then samples 114, 116, 118 will be generated for each z increment as the ray 104 steps through the fog. Unless the fog is very thick, each sample 114, 116, 118 will be associated with an alpha value that is much closer to 0.0 than to 1.0. It should be noted that generally, environmental effects such as fog will produce a very large number of samples corresponding to each of the increment throughout the thickness of the fog; however, the samples 114, 116, 118 of FIG. 1A have been reduced for ease of explanation. When the ray 104 encounters the window 108, a new sample 120 can be generated. Similarly, when the ray 104 encounters the human character 110 and the structure 106 additional samples 122, 124 can be generated, respectively.

In this simplified example a single pixel will have at least six different samples corresponding to six different Z depth levels. Traditionally, the six samples can be flattened into a single value for the pixel 128. This would result in a traditional 2-D image consistent with the projection on the picture plane 126. However, it has recently been discovered that numerous advantages can be realized by providing the sample data to post-rendering processes. An image file that includes all of the samples for each pixel in the image is generally referred to as a "deep image" or "deep data" because samples for each varying level of depth are available for each pixel. For example, post-rendering processes such as color correction and deep-image compositing are greatly enhanced when providing a deep image from the renderer.

In practice, deep images can capture very complex scenes with hundreds or thousands of 3-D objects in view. This results in deep image files that have hundreds or thousands of samples for each pixel. As resolution increases and the number of pixels per image grows, deep image sizes can become prohibitively large. For example, for a 2-D image that would normally require 1-2 MB of storage, the corresponding deep image can require over a gigabyte of storage. Storage size can be of concern because most post-rendering processes must load the deep image into memory during processing.

However, despite size concerns for deep images, the embodiments described herein can either repurpose an existing data field for each sample in a deep image, or add a new data field for each sample. This new data field can include what is referred to herein as a "deep identifier" or simply an "identifier." When objects in the 3-D virtual scene are rendered to generate samples in a deep image, relationships between those samples are lost. For example, a first pixel that includes samples of the human character 110 would include no information linking those samples to a second pixel that also includes samples of the human character 110 in the deep image. As will be described further below, maintaining this linking information for relationships between samples in the rendering process can be very beneficial for a number of different types of post-rendering operations.

Figure 1B:
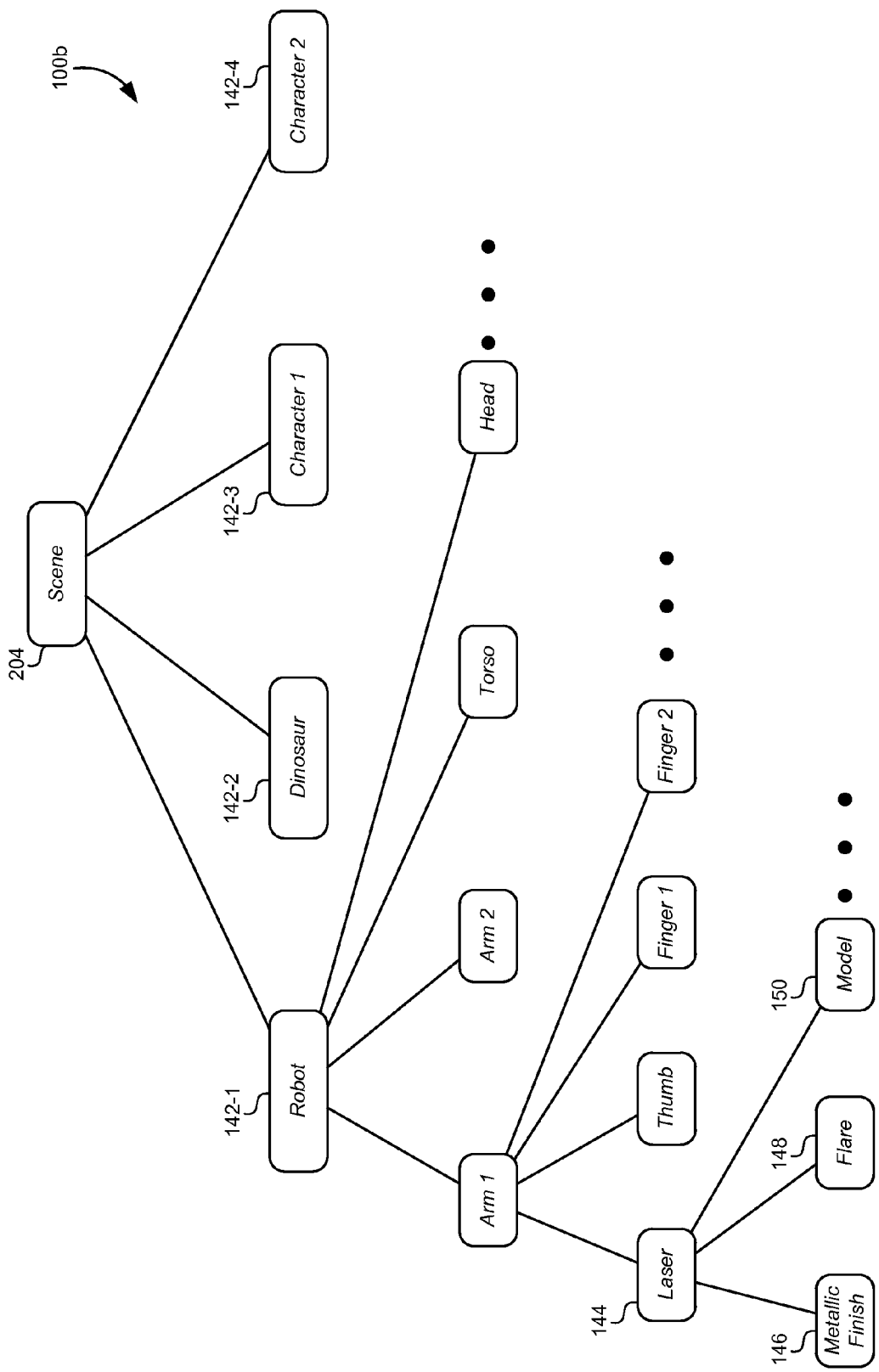
FIG. 1B illustrates a diagram of a hierarchical scene graph, according to some embodiments.

FIG. 1B illustrates a diagram of a hierarchical scene graph 100b, according to some embodiments. Generally, a scene graph may include a hierarchical data structure that arranges the logical and spatial representations of a 3-D virtual scene. In some embodiments, the scene graph 100b may include a collection of nodes organized into a graph or tree structure. An operation performed on an object in the scene graph can automatically be propagated to each child in the data structure. Additionally, nodes in the scene graph can include relationships with any other node. For example, node extensions may be supported that refer to other nodes in the scene graph.

In the example of scene graph 100b, the scene includes a root node 140, and child nodes 142 that represent major objects or "assets" in the scene. For example, the scene may include a robot 142-1, a dinosaur 142-2, and various human characters 142-3, 142-4. In addition to representing major objects in the scene, the scene graph 100b may include graphical components that are used to build each object. In this example, the robot 142-1 may include (among other things) two arms, a torso, a head, and so forth. Each object in the scene graph may include any number of generational child layers that further break down each object into component parts. Additionally, graphical effects, textures, simulated materials, environmental elements, and/or the like, can be added to the scene by virtue of the scene graph 100b. For example, a laser object 144 in the robot's hand may be associated with a metallic finish 146, a flare effect 148, geometric model 150, and so forth. It should be noted that scene graph 100b is merely exemplary and not meant to be limiting. Different data structures may be implemented in different applications, depending on whether the scene to be rendered is part of a gaming environment, a feature film, a mobile device production, and so forth.

Prior to this disclosure, these relationships between objects were typically lost during the rendering process. In other words, a single sample in a pixel generally included information about the color, opacity, velocity, etc. of that particular sample, but did not include any information linking that sample to other samples in the same or other pixels. However, when assigning a deep identifier as described below, this relationship information can be encoded within the deep identifier and propagated through the rendering process.

Figure 2:
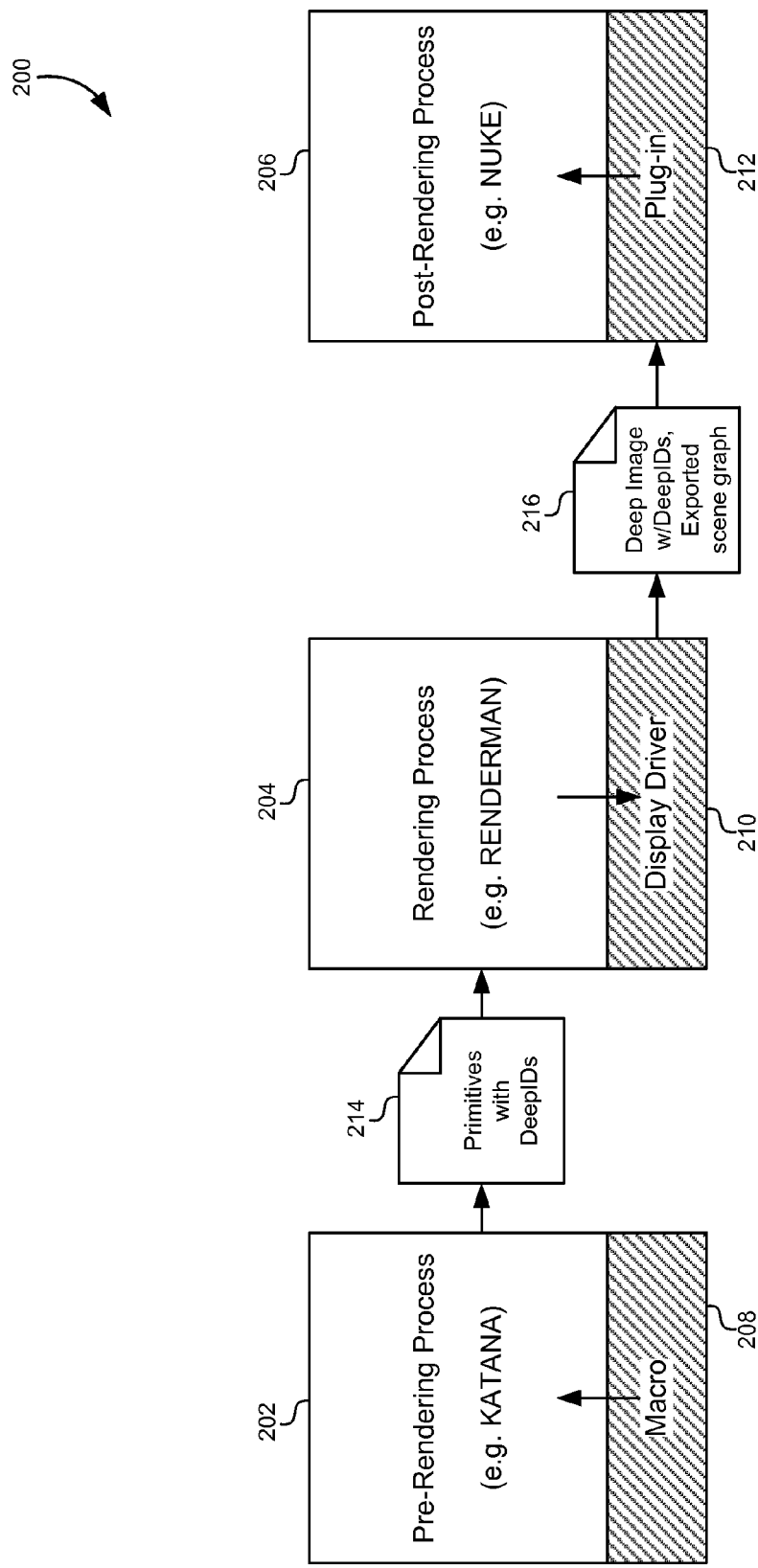
FIG. 2 illustrates a block diagram of a system for using deep images with deep identifiers through the rendering and composition processes, according to some embodiments.

This rendering process may include at least three types of computational modules. FIG. 2 illustrates a block diagram of a system for using deep images with deep identifiers through the rendering and composition processes, according to some embodiments. Block diagram 200 includes at least three stages in a graphics pipeline for generating 2-D images from 3-D virtual scenes. Note that other stages in the graphics pipeline (model/rig design, character animation, lighting effects, etc.) have been omitted for simplicity.

The white blocks in block diagram 200 may represent existing processes in the graphics pipeline. In contrast, the shaded blocks represent alterations or additions that can be made to the existing processes in order to facilitate deep identifier assignment, propagation, and/or use. For example, macros, drivers, plug-ins, components, and/or the like, can be added to existing software packages in order to implement deep identifiers. Alternatively or additionally, the existing processes themselves can be redesigned to incorporate the functions described herein.

Elements of a 3-D virtual scene may be received by a pre-rendering process 202. Generally, any portion of the graphics pipeline that occurs prior to rendering may referred to as a pre-rendering process. For example, a pre-rendering process such as a "Lighting and Look" development tool like the commercially available KATANA® product may be referred to as a pre-rendering process 202. In order to use deep identifiers, each primitive can be assigned a unique identifier prior to the rendering process. In some embodiments, the pre-rendering process may have the ability to assign IDs to each element of the 3-D virtual scene. In order to implement this feature, a macro 208 can be programmed into the pre-rendering process 202 that automatically generates and assigns deep identifiers to each primitive. In some embodiments, the primitives can be organized in a hierarchical arrangement within the 3-D virtual scene in a scene graph. The macro 208 can be designed such that the hierarchical relationships of the 3-D virtual scene are encoded into the deep IDs themselves. A specific example of how deep IDs can be assigned to primitives in a hierarchical fashion will be discussed in greater detail below.

The pre-rendering process 202 can pass elements of the 3-D virtual scene including primitives associated with identifiers 214 to a rendering process 204. Merely by way of example, the commercially-available RENDERMAN® product provides an application programming interface for rendering complex virtual 3-D scenes using a rendering farm of client computers. In some embodiments, the rendering process 204 can render the 3-D virtual scene such that the identifiers are propagated through the rendering process. For example, a primitive may be associated with a specific identifier. Throughout the rendering process, any sample from that primitive will also be associated with the primitive's identifier in the resulting deep image.

The rendering process 204 can be augmented by a custom display driver 210 that processes the deep image. For example, the display driver 210 can perform a compression algorithm on the deep image using deep identifiers to reduce the size of the deep image and thus realize savings in memory, network bandwidth, and/or processing power required to handle the deep image.

A deep image that includes the deep IDs 216 can be passed from the display driver 210 to a plug-in 212 for a post-rendering process 206. The plug-in 212 can be configured and programmed to accept the deep image 216 and in turn provide an output acceptable for the post-rendering process 206. For example, the plug-in 212 can include an interface that allows users to select objects from the scene graph by selecting samples in the deep image. The plug-in 212 can also recolor or highlight specified groups of objects that include common attributes as encoded by the deep identifiers. In some embodiments, the deep image with deep identifiers may also be accompanied by the scene graph used in the pre-rendering process 202. The scene graph can be exported as an auxiliary file and can be used by the post-rendering process 206 to make selections of objects using the scene graph. For example, a user could select a character by name in the scene graph and see all the samples related to that character displayed in the plug-in 212 of the post-rendering process 206.

Additionally, the plug-in 212 can be configured to decompress a compressed deep image into a format such that the post-rendering process 206 expecting a regular deep image file can be accommodated. For example, compositing software such as the commercially-available NUKE® software package can be configured to accept deep image files. A C++ nuke plug-in can be designed to take advantage of compressed deep images and supplied ID information to provide streamlined workflows that allow users to pick any surface within the deep image for matte or coloring purposes. Specifically, using deep IDs in conjunction with a deep image can reduce the need for the usual round trips into the pre-rendering process 202 (KATANA) to set up surface selections for matte renders. Additionally, using a deep ID can enable a process of establishing relationships between samples, thus allowing unprecedented flexibility in image-space selection capabilities. For example, deep identifiers can be used to produce edge, opacity, and/or motion-blur results for arbitrary surfaces selected as groups of pixels with similar IDs. These examples of a post-rendering process 206 are merely exemplary and not meant to be limiting.

Figure 3:
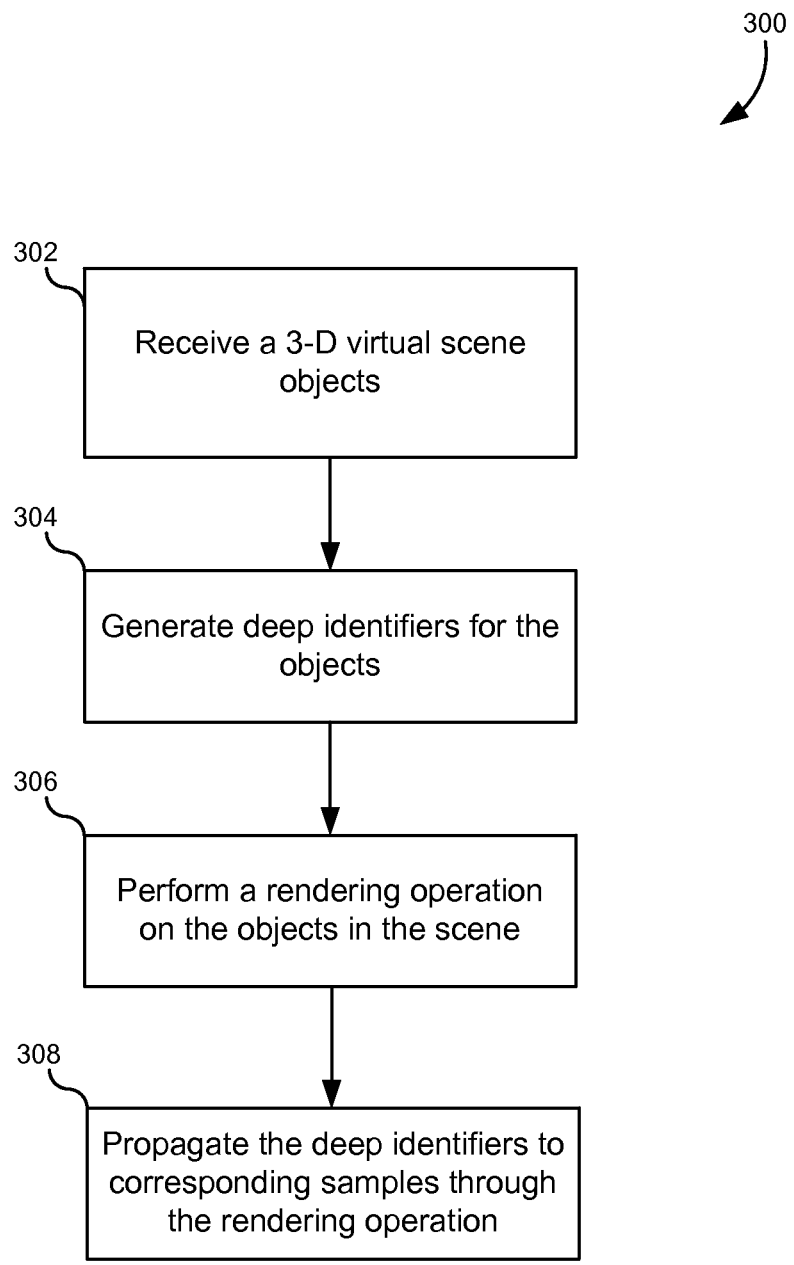
FIG. 3 illustrates a flowchart of a method for generating a deep identifier, according to some embodiments.

FIG. 3 illustrates a flowchart 300 of a method for generating and propagating deep identifiers through the rendering process, according to some embodiments. Flowchart 300 illustrates a broad overview of method steps that can be combined to (1) analyze a scene graph hierarchy, (2) generate deep identifiers that encode the hierarchical/attribute information, (3) propagate the deep identifiers through the rendering process, and (4) make the deep identifiers available in a deep image for post-rendering operations. Following the description of flowchart 300, some specific examples will be described for how deep identifiers may be generated and propagated.

The method may include receiving objects from a 3-D virtual scene (302). The objects in the 3-D virtual scene may include characters, objects, environmental effects, background elements, and/or the like. As described in above in relation to FIG. 1B, the objects may be organized in a hierarchical data structure such as a scene graph. The scene graph can include parent-child relationships at various levels, such as assets, groups, names, instances, and/or the like. The scene graph hierarchy may also include textures, effects, materials, and/or other attributes that may be applied to geometries. For example, a laser gun may include a flare effect, a metallic finish, a rust effect, and so forth.

The method may additionally include assigning deep identifiers to the objects in the 3-D virtual scene (304). The deep identifiers can store arbitrary amounts and types of information that can be attached to objects prior to generating deep images for rendering. In some embodiments, a deep identifier can be assigned to every piece of geometry or primitive in the scene graph. In other embodiments, a deep identifier might only be assigned to pieces of geometry at certain hierarchical levels.

Generally, a deep identifier can be generated and assigned in a way that encodes the organization of the 3-D virtual scene and the attributes of the individual geometries. For example, the identifier may be generated based on a position of an object in the scene graph hierarchy. This encoded information can then be used to maintain relationships between geometries and attributes in later post-rendering processes. In some embodiments, a deep identifier, or portion of a deep identifier, may be assigned by using a hash function on the geometry. For example, some top-level assets will have string names, such as "R2-D2" that can be hashed to generate a numerical value. In other embodiments, numerical identifiers can be extracted from the scene graph and used to construct a deep identifier. This particular methodology will be discussed in greater detail below.

The method may additionally include performing a rendering operation on the objects in the 3-D virtual scene (306). The rendering operation may generate a 2-D image comprised of a plurality of pixels. Each object in the scene graph hierarchy may generate one or more samples that are assigned to a pixel as described in relation to FIG. 1A above. Each pixel may include samples from many different objects, and samples from a single object may be spread across many different pixels. The rendered output that includes all of the samples for each pixel is referred to as a deep image, or deep image file.

The method may further include propagating the deep identifiers to corresponding samples through the rendering operation (308). For example, a laser gun belonging to an animated character in the 3-D virtual scene may be assigned a deep identifier of "2828773." As the laser gun is rendered, multiple pixels in the deep image will include samples generated from the geometry or effects of the laser gun. Each of these samples may include the deep identifier "2828773" such that it is possible for a deep-image compositing operation to later select each of the samples associated with the laser gun after the rendering process is complete. In order to propagate the deep identifier, the deep identifier may be stored as an attribute or in some other data field that is propagated by the rendering operation.

Figure 4:
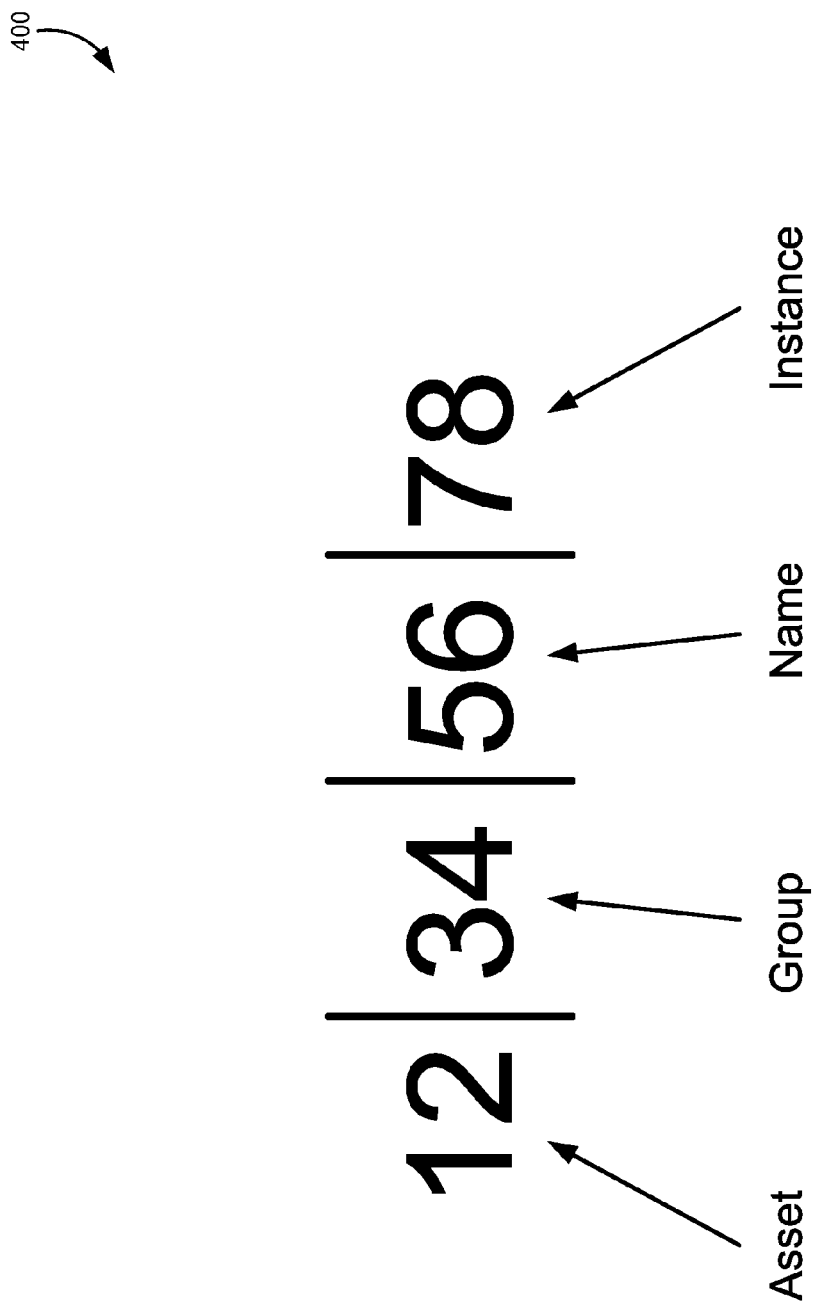
FIG. 4 illustrates one example of a deep identifier that can be propagated through the rendering and composition process, according to some embodiments.

FIG. 4 illustrates one example of a deep identifier 400 that can be propagated through the rendering and composition processes, according to some embodiments. It should be noted that many different ways to assign identifiers to primitives may become apparent in light of this disclosure. The format and assignment of identifiers as described below is merely exemplary and not meant to be limiting. Certain rendering processes can provide special attribute assignments to surfaces that receive special treatment during the render process. By way of example, RENDERMAN® may provide a command for assigning a special attribute, such as Attribute "identifier" "int id" [2828773]. When the rendering process sees this type of information, the rendering process can be instructed to handle it in such a way that this value is preserved so that it is not subjected to the effects of filtering or pre-multiplication as it makes its way into a deep output file. It should be noted that generally adding an additional field to be propagated through the rendering process and stored in each sample would be very inefficient because this would dramatically increase the size of the deep image file. Generally, rendering programmers try to make any deep image file as small as possible in order to reduce the memory and processing load placed on the rendering and post-rendering processes. Counterintuitively, adding additional information to the deep image file as been discovered to be useful as a means for compressing the deep image file and can actually save space by reducing the number of deep images that need to be saved as the number of round-trip render sessions are reduced.

Generally, the identifier may be represented in memory by an N-bit integer. Some embodiments can subdivide the bit fields within the N-bit integer such that each bit field identifies a unique hierarchical aspect of a primitive. By way of example, consider the 8-digit decimal number used as deep identifier 400 in FIG. 4. The deep identifier 400 can be subdivided into groups or partitions, and each partition of the digit can be assigned to various elements in a scenegraph hierarchy. Thus, each location in the scene graph hierarchy can be associated with a different set of digits within the deep identifier 400. Over the course of processing the scenegraph hierarchy by the macro in the pre-rendering process, different sets of digits within the deep identifier 400 can be built-up to form a final value for the deep identifier 400. In some embodiments, a deep identifier 400 that has values assigned to each set of digits will generally be associated with a leaf primitive in the scenegraph hierarchy.

By way of example, the deep identifier 400 in FIG. 4 is partitioned into four 2-digit partitions. Each of the partitions can be assigned a value corresponding to a particular level in a scene graph hierarchy or corresponding to any arbitrary property associated with levels in the scene graph hierarchy. In this particular example, these four different partitions within the deep identifier 400 have been arbitrarily assigned as an asset, a group, a name, and an instance. Each of these sub-IDs can be assigned to node levels in the scene graph hierarchy. An example of how the assets/group/name/instance structure for a deep identifier may be constructed from a scene graph hierarchy will now be described.

Figure 5:
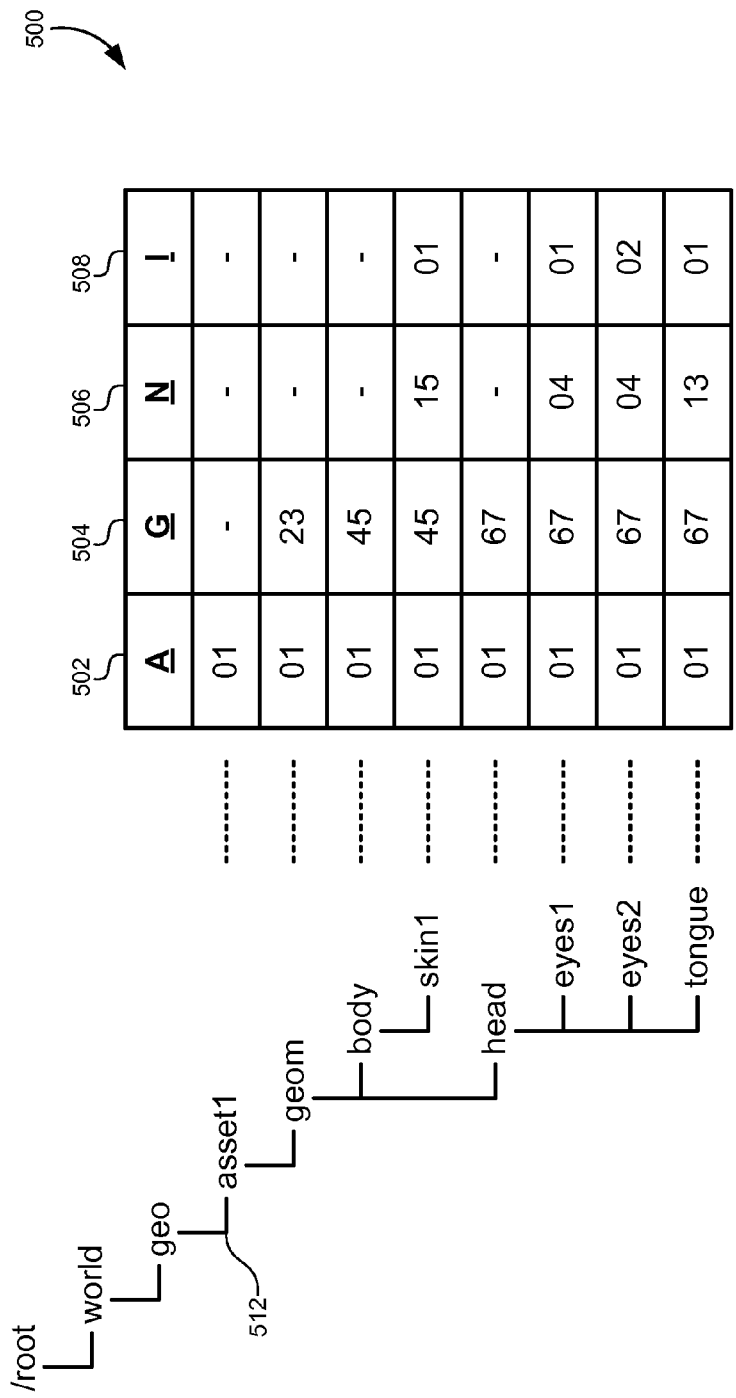
FIG. 5 illustrates one example of how a deep identifier can be constructed based on a scenegraph hierarchy, according to some embodiments.

FIG. 5 illustrates a diagram 500 of how a deep identifier can be constructed, according to some embodiments. Continuing with the example of an 8-digit deep identifier 510, a scene graph hierarchy 512 can begin at a root, and descend through a world, a geography, an asset, a geometry, and so forth, down through each primitive within the geometry of the asset. It should be noted that this scene graph hierarchy is merely exemplary and simplified for purposes of explanation. Most scene graph hierarchies will be much more complicated and may involve various levels with arbitrary collections of attributes or properties associated therewith.

By way of example, distinct partitions within the deep identifier 510 can be assigned an asset 502, a group 504, a name 506, and an instance 508 as sub-IDs for each primitive. These sub-IDs can be driven by each relative location in the hierarchy and any associated attributes. The process of attaching these sub-IDs can be arbitrary, but for the purposes of this example, they have been assigned based on different levels of the hierarchy. Here, "asset1" is assigned the digits "01" in the asset 502 portion of the deep identifier 510. The asset may correspond to an animated character, such as a robot or a monster in the 3-D virtual scene. In similar fashion, child locations can be assigned the digits "23," "45," and "67." In some embodiments, attribute inheritance can be implemented by the pre-rendering process or the pre-rendering process macro such that child elements will inherit digits from parent elements. For example, the "head" group is assigned the a group ID "67" and inherits the asset ID "01" from the parent "asset1" element. For an animated character, other groups may include a torso group, a leg group, an arm group, a head group, and so forth. Descending through the screen graph hierarchy can assign digits to the name 506 portion of the deep identifier 510, such as "15," "04," and "13" for the "skin," "eyes," and "tongue" elements, respectively. The name may specifically identify primitives used as building blocks for each group, such as eyes, ears, a nose, a mouth, or a head group of the character asset. The name may also include effects, attributes, surfaces, textures, and/or the like that are applied to the group, such as a lighting effect, a particular texture, surface material, et cetera. Each instance of the name 506 can also receive a digit assignment that provides unique identifiers for each leaf in the scenegraph hierarchy 512. In this example, each leaf in the scene graph hierarchy 512 is guaranteed to have all four digit partitions in the deep identifier 510 assigned, thus generating a complete deep identifier 510. It should be noted that the macro may also generate the deep identifier 510 using binary digits, and the concepts described above for decimal digits may be implemented in a similar fashion.

Some embodiments may also use hashing algorithms to map deep identifiers to objects in the scene graph. In the example above, each partition in the deep ID was assigned based on a numerical identifier derived from the scene graph hierarchy. Generally, these numerical identifiers are sequential in nature and assigned randomly as the scene graph is built. Alternatively, numerical identifiers may be generated through a hash algorithm that accepts information associated with an object as input. For example, an object may have a name that is used as a hash input, such that each "arm" object receives a same numerical value for the deep identifier. In another example, an object may have an attribute, such as a color or a finish, that may be used as an input to a hash algorithm, the output of which would generate at least a portion of a deep identifier. Because identical input values will hash identically, this ensures that objects with the same attributes or names will maintain a consistent deep identifier through the entire process. Any type of hashing algorithm may be used, such as a simple hash, a Bernstein hash, a Zobrist hash, a Pearson hash, and/or any other well-known hashing algorithm.

By using a finite memory size to represent deep identifiers, the number of digits may only support a finite number of 3-D virtual scene elements. In the example above, using a 2-digit asset identifier would only provide for 100 different values. This could lead to collisions where multiple leaves in the scene graph hierarchy 512 have the same deep identifier. This can be resolved by altering the partition size according to the number of assets, groups, names, and/or instances, or by increasing the size of the deep identifier.

Figure 6:
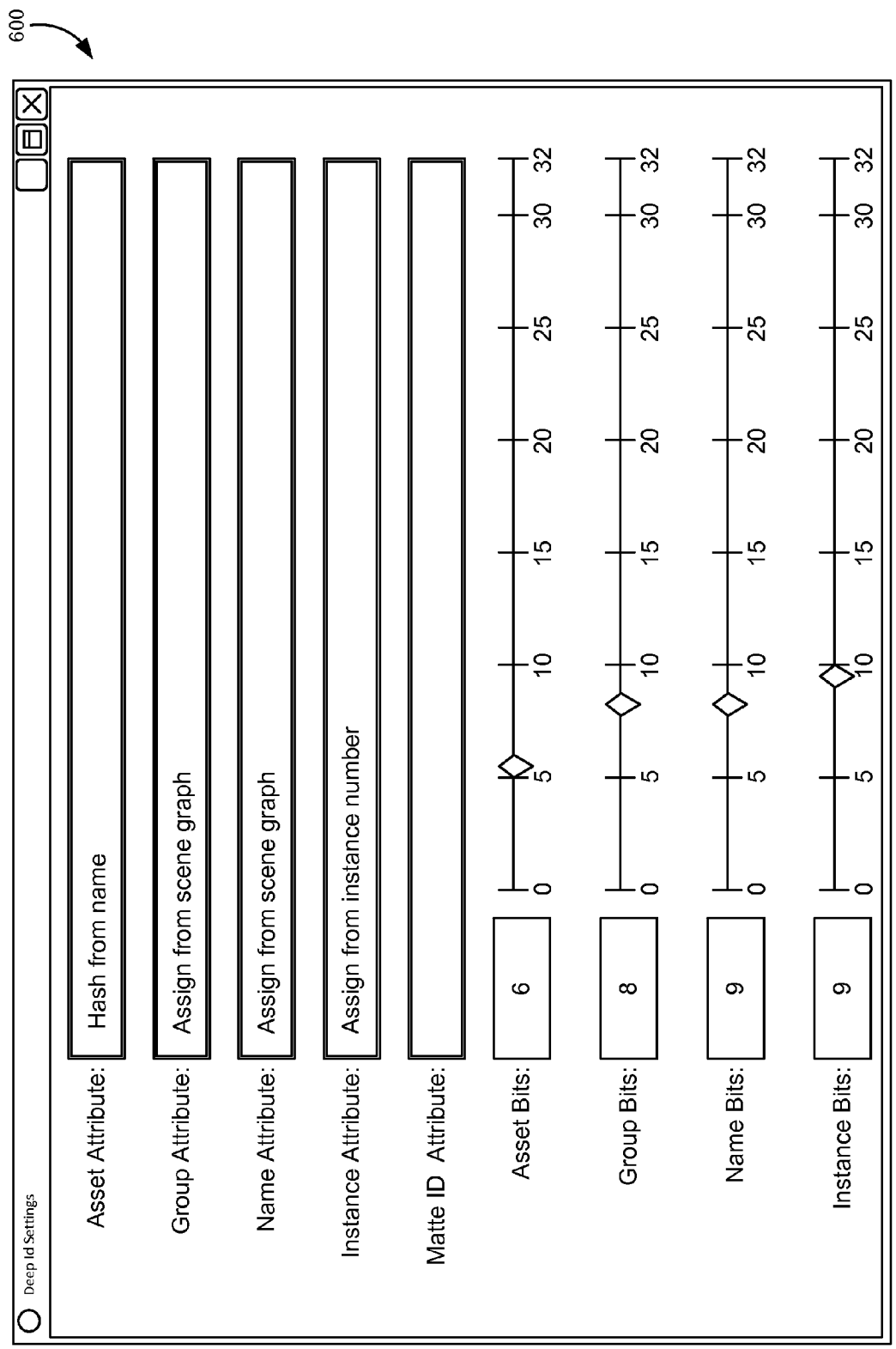
FIG. 6 illustrates how deep identifier partitions and attributes can be optimized based on the makeup of the scene graph, according to some embodiments.

FIG. 6 illustrates how deep identifier partitions and attributes can be optimized based on the makeup of the scene graph, according to some embodiments. Each 3-D virtual scene may include varying numbers of top-level assets, groups per asset, and individual primitives. For example, one scene could include upwards of 1000 top-level assets in a scene that comprises snakes, lizards, and other small animals in a high visual concentration. However, each of these assets may be fairly simple and may be comprised of only one or two groups and a few primitive instances. In contrast, another scene with a complex robot may only include a few top-level assets, but each of these assets may include thousands of groups and primitive instances. Therefore, some of the embodiments described herein allow for a varying number of bits to be used in each partition in the deep identifier.

FIG. 6 shows an exemplary interface that allows the scene designer to specify the number of bits and partition depending on the complexity and makeup of the 3-D virtual scene. By way of example, the deep identifier may include 32 bits, with a varying number of bits assigned to each of four partitions. A designer may begin assigning the number of asset bits depending on the number of top-level assets, the number of groups in the scene per asset, and so forth until each partition has been assigned a value. In some embodiments, when the number of bits in one partition has been assigned or adjusted, partitions below in the scene graph hierarchy may automatically reduce or increase their assigned bits so as to keep the deep identifier at, for example, 32 bits. In this particular embodiment, a slider control can be used to adjust the number of bits for each partition up and/or down. Additionally, a text box is also provided for each asset bit to display the selected choice and also to receive a textual user input.

The interface shown in FIG. 6 may also allow a scene designer to specify how the values for each partition should be generated in the associated asset attribute, group attribute, name attribute, and/or instance attribute text-entry controls. Here, the scene designer can specify that a numerical value should be assigned based on a hash function, based on a scene graph number, based on instance number, and/or the like. The scene designer can also use a matte ID attribute for generating matte images for use during compositing.

In some embodiments, this process of distributing bit partitions in the deep identifier field may be carried out automatically by a computer system instead of being done manually by a user. The computer system can analyze the scene graph hierarchy and count the number of assets, groups, names, instances, attributes, and so forth. The computer system can then automatically assign a number of bits to each partition corresponding to the number of assets/ groups/name/etc. in the scene graph hierarchy. These automatic assignments can then be used to generate deep identifiers for each object in the hierarchy. In this manner, generating and propagating deep identifiers can be a completely automated process that is hidden from the user. The user may simply have the option to make selections during the deep compositing process that previously were not available, while the deep identifier details are abstracted below the level of the user interface.

Figure 7:
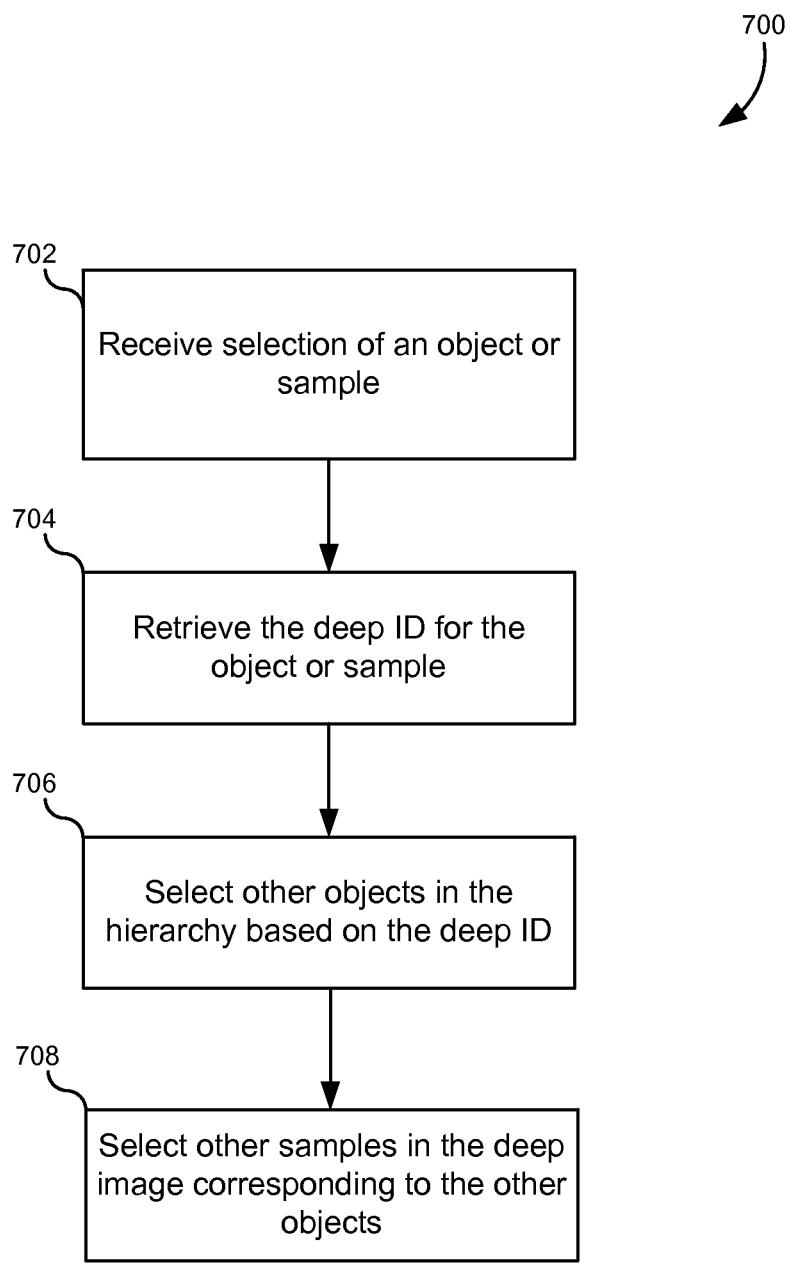
FIG. 7 illustrates a flowchart of a method for using deep identifiers in post-render processes, according to some embodiments.

FIG. 7 illustrates a flowchart 700 of a method for using deep identifiers in post-render processes, according to some embodiments. This method may be performed after the 3-D virtual scene has been rendered and the deep identifiers have been propagated through to samples of the deep image. The method may include receiving a selection of an object or sample (702). For example, a compositor may select an object ID from the scene graph, such as an asset number corresponding to a robotic character. This asset ID can be used to search the asset partition of each sample to determine which samples belong to the asset in the deep image. Alternatively, a compositor could select a sample from a pixel in the deep image. In this case, the compositor does not need to know which object or deep identifier the sample belongs to. Instead, the compositor can simply select a sample and then use the deep identifier to reference other samples that are related through the scene graph hierarchy or through an attribute. Selecting a sample from a deep image may be done through a graphical interface that displays samples according to their deep identifiers by coloring pixels based on common partitions within the deep identifiers. Such a graphical interface will be described in greater detail below in relation to FIGS. 8A-8B.

The method may also include retrieving the deep identifier for the object/sample (704).

If an object is selected by virtue of the scene graph, then a deep identifier may be constructed for the object. For example, if a top-level asset representing a robotic character is selected, and if the identifier comprises an 8-digit number with two-digit partitions in the form of "AAGGNNII" as shown in the example of FIG. 4, then the computer system can generate a deep identifier in the form of "AA******" with wildcards. This can be used to match deep identifiers in the deep image for every sample that belongs to the robotic character "AA" in the scene graph. In embodiments where a sample is selected in the deep image, the sample itself can store the deep identifier associated with the sample. This can simply be extracted from the sample after the sample is selected.

The method may additionally include selecting other objects in the hierarchy based on the deep identifier (706). Additional objects may be selected based on common attributes or based on a parent-child relationship in the scene graph hierarchy. For example, if a top-level asset is selected as described above, groups, names, and instances that fall under the top-level asset in the scene graph hierarchy may also be selected. This allows a compositor to select the arms, legs, torso, head, etc., of the robotic character such that post compositing operations can be performed on every sample involving the robotic character. For example, the robotic character could be used to generate a matte image or cut-out for adding environmental effects such as fog or mist. The robotic character could also undergo a motion blur operation or a relighting operation during compositing.

In cases where a sample has been selected rather than an object, the method can use the deep identifier extracted from the selected sample to locate a particular instance corresponding to the sample in the scene graph hierarchy. The method can then select other objects appearing above the instance in the scene graph hierarchy. For example, the selected sample may correspond to a hand of the robotic character. The method may then present options to select the hand, the arm group, or the entire robotic character asset. Once additional objects are selected, deep identifiers for each object can be created or extracted as described above.

Of course, step 706 may be completely optional. Is that a selecting other objects in the hierarchy based on the deep identifier, the selected sample/object may simply select all samples with a deep identifier that matches the selected sample/object. For example, if a hand is selected, the deep identifier of the selected sample/object may be used to select only other samples that correspond to the hand of the robotic character.

In cases where other objects are selected, the method may further include selecting other samples in the deep image corresponding to other objects (708). The deep identifiers for the additional objects will be known based on the previous steps of the method. These deep identifiers may then be used to search through each sample in the deep image to locate samples that match the deep identifiers. As described above, the deep identifiers may include wildcards to select any samples that match at least one of the partitions in the deep identifier. After selecting all the samples, any post-compositing operation may be carried out using the selected samples, such as relighting, motion blur, color adjustments, generating matte images, and/or the like.

Figure 8A:
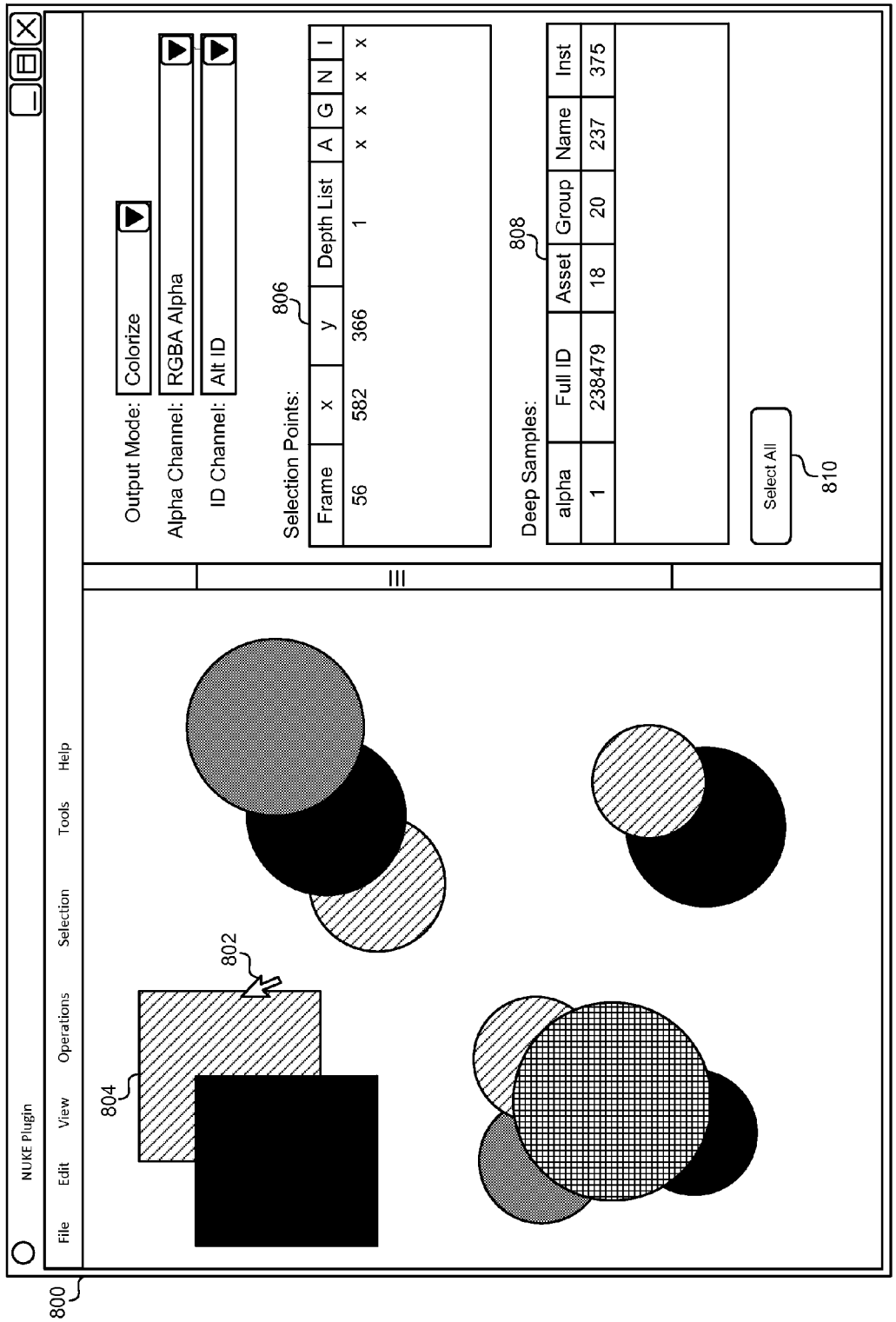
FIG. 8A illustrates an exemplary post-render deep image, according to some embodiments.

FIG. 8A illustrates an exemplary post-render deep image, according to some embodiments. In a deep image, each pixel typically includes many different samples from the rendering process. Therefore, in order to display a deep image to convey information to a compositor, special visualization tools have been developed that not only display a deep image, but also leverage the deep identifiers stored with each sample. Interface 800 provides one example of how information in a deep image may be displayed according to deep identifiers. In one embodiment, a plug-in for a deep compositing tool (such as NUKE®) may be used to display each sample as a false color based on the deep identifiers. This type of visualization enables a compositor or artist to make direct selections from deep image locations. The plug-in can register the selections to produce an output that are then restricted to those selections. In other words, a compositor can graphically select a displayed sample, and the tool can automatically select and display other samples corresponding to the deep identifier of the selected sample.

Behind the scenes of this process a reverse analysis can be applied to decompose the selected deep identifier into its constituent components as described above the method 700. Various partitions within the deep identifier can be extracted to generate a set of numerical identifiers that can be used to compare, search, select, and display other samples that match the asset, group, name, instance, attribute, etc. of the selected sample according to the deep identifier. In FIG. 8A, a selection tool 802 may be provided such that a user can select displayed pixels and select one of the samples in the selected pixel. In this example, the selection tool 802 has selected a pixel belonging to object 804 in the display area of the interface 800. Information can then be displayed to the user based on the selection, such as the available samples within that pixel. A selected pixel interface 806 can provide the screen location of the selection, the depth of the pixel selected, and a small overview of the deep identifier partitions available. A deep sample interface 808 can display more information about the available samples in the pixel and their respective deep identifiers. In this example, the deep sample interface 800 can display the deep identifiers in a numerical format and decompose the deep identifiers into their various partitions. Note that in this example, the deep identifier is partitioned by bit fields rather than by digits, therefore the partitions are not simply digits extracted from the deep identifier, but rather binary values extracted from bit fields. The deep sample interface 808 can also be used to select between multiple samples in a single pixel. In the simplified example of FIG. 8A, the selection tool 802 has selected a pixel with only a single visible sample. In more realistic examples, a selected pixel may include many samples samples, many having alpha values less than 1.0 that are available to a user. The user can then select one or more samples from among the available samples in the selected pixel.

Figure 8B:
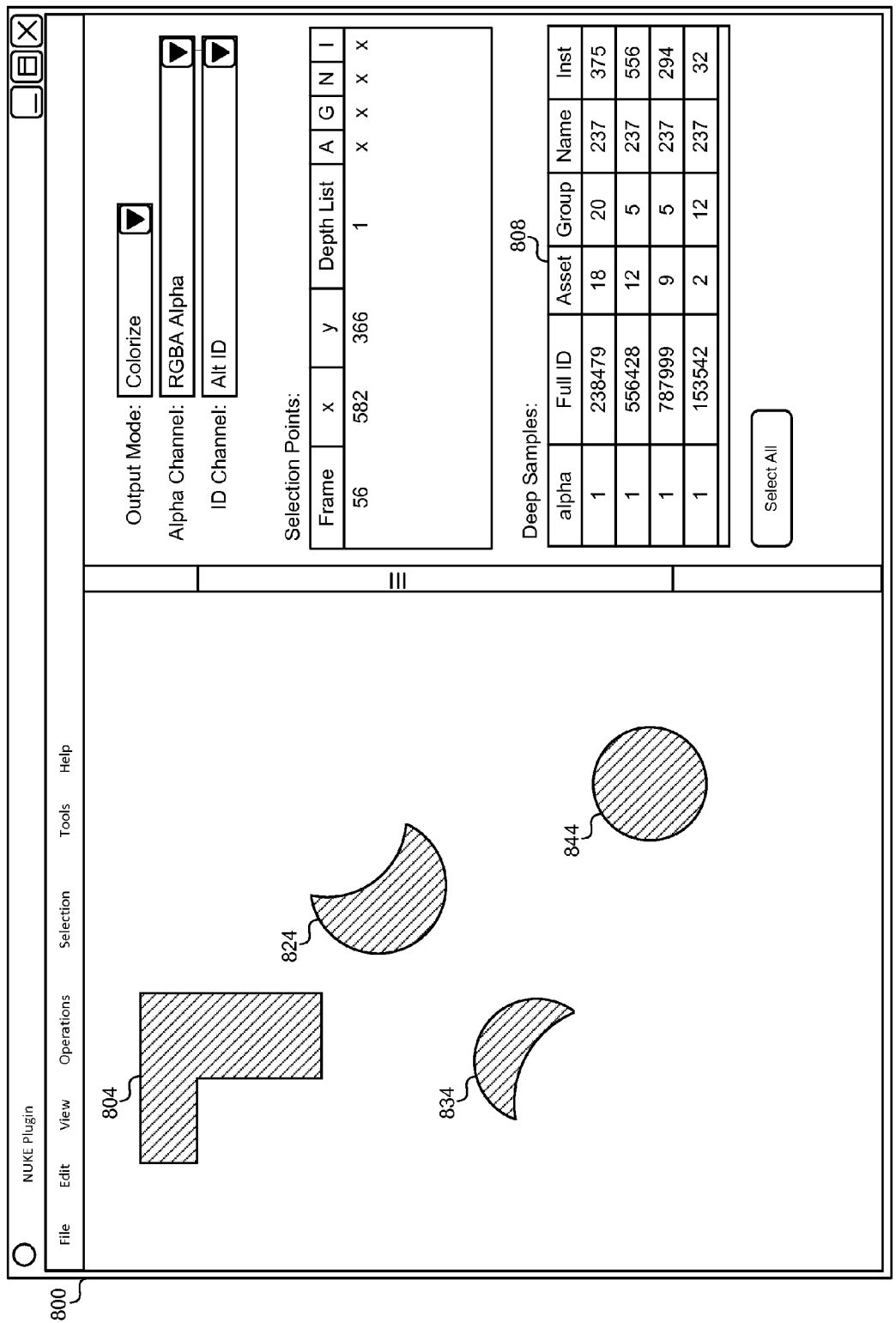
FIG. 8B illustrates an exemplary post-render deep image with selections made using deep identifiers, according to some embodiments.

A control 810 may be provided to select all samples in the deep image that match one or more fields in the deep identifier. In some embodiments, a user can select one or more partitions in the deep identifier to match against other samples in the deep image. For example, a user could select the asset "18" partition in the deep identifier and then use the control 810 to select all other samples in the deep image that correspond to asset "18". A user can also choose multiple partitions in the deep identifier, such as the group and name partitions to select other corresponding samples in the deep image. For example, a user could select the group and name partitions to select all of the eyes in a head group of a character in the deep image. FIG. 8B illustrates an exemplary post-render deep image with selections made using deep identifiers, according to some embodiments. A sample of the selected object 804, along with other objects in the deep image 824, 834, 844, have been isolated on the display of interface 800. At this point, the user can perform any post-compositing operation on the remaining image. For example, a matte image can be generated using objects 804, 824, 834, 844 as cut-outs. The user can also perform a recoloring operation on these objects, and so forth. Objects 804, 824, 834, 844 may be selected using deep identifiers as belonging to the same asset, group, name, etc., or for having a common attribute, such as a particular material, finish, effect, texture, and/or the like.

Interface 800 can provide basic features provided by simply having access to deep identifiers that encode relationships in the scene graph. As described above, some embodiments may export the scene graph as an auxiliary file to accompany the deep image through the rendering process. According to method 700, this enables users to have access to a screen graph and thus make selections out of it during compositing. In other words, users can select objects in the scene graph and see those objects and other related objects displayed in the compositing software plug-in from the deep image. Instead of making graphical selections from the deep image, users can enter text of object names, such as a robotic character's name, and the deep sample information can be derived from the scene graph. One particular advantage to exporting the scene graph is that when attribute values of objects change after rendering, only the scene graph needs to be re-exported. The image does not need to be re-rendered.

Figure 9:
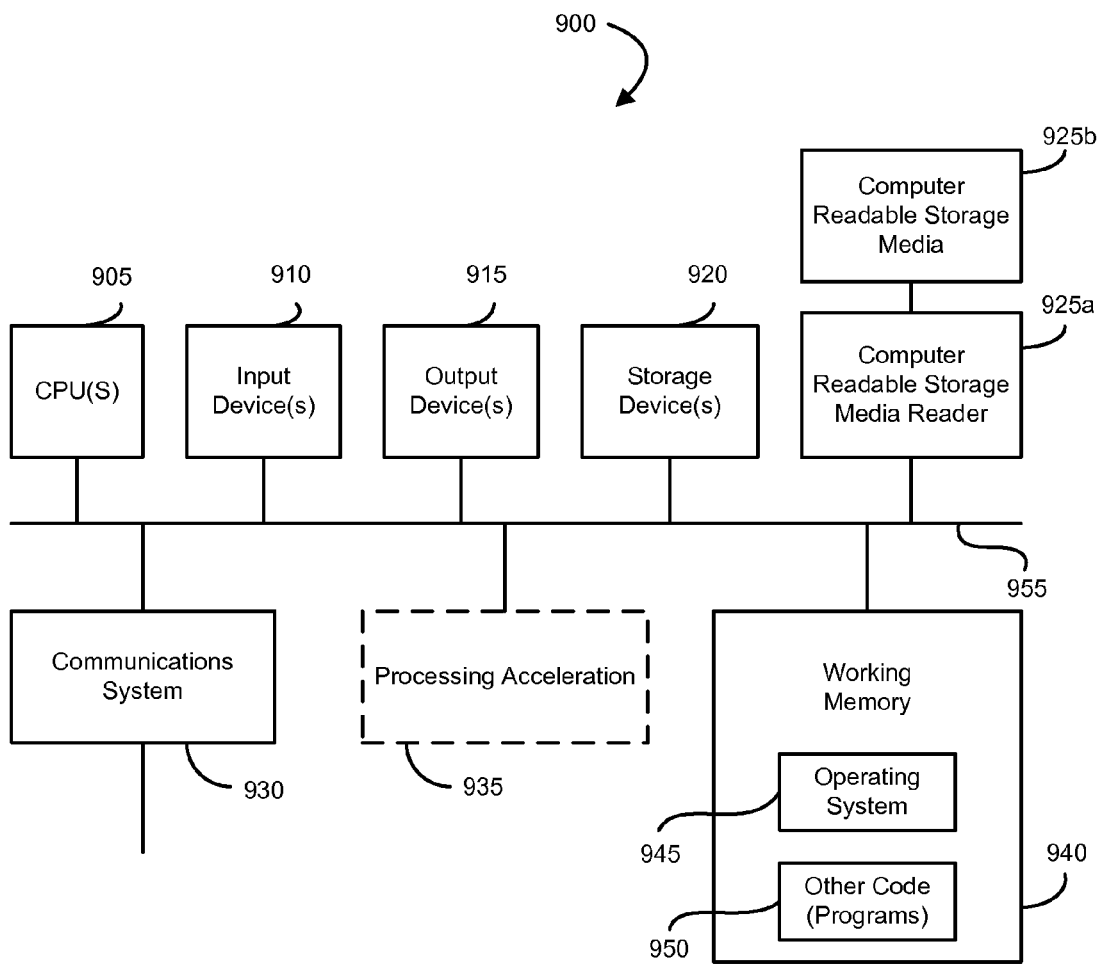
FIG. 9 illustrates a block diagram of an exemplary computer system in which embodiments may be implemented.

Each of the embodiments disclosed herein may be implemented in a special-purpose or a general-purpose computer system. FIG. 9 illustrates an exemplary computer system 900, in which parts of various embodiments of the present invention may be implemented. The system may be used to implement any of the computer systems described above. The computer system 900 is shown comprising hardware elements that may be electrically coupled via a bus 955. The hardware elements may include one or more central processing units (CPUs) 905, one or more input devices 910 (e.g., a mouse, a keyboard, etc.), and one or more output devices 915 (e.g., a display device, a printer, etc.). The computer system 900 may also include one or more storage device 920. By way of example, storage device(s) 920 may be disk drives, optical storage devices, solid-state storage device such as a random access memory ("RAM") and/or a read-only memory ("ROM"), which can be programmable, flash-updateable and/or the like.

The computer system 900 may additionally include a computer-readable storage media reader 925a, a communications system 930 (e.g., a modem, a network card (wireless or wired), an infra-red communication device, etc.), and working memory 940, which may include RAM and ROM devices as described above. In some embodiments, the computer system 900 may also include a processing acceleration unit 935, which can include a DSP, a special-purpose processor, a Graphic Processing Unit (GPU), and/or the like.

The computer-readable storage media reader 925a can further be connected to a computer-readable storage medium 925b, together (and, optionally, in combination with storage device(s) 920) comprehensively representing remote, local, fixed, and/or removable storage devices plus storage media for temporarily and/or more permanently containing computer-readable information. The communications system 930 may permit data to be exchanged with the network 920 and/or any other computer described above with respect to the system 900.

The computer system 900 may also comprise software elements, shown as being currently located within a working memory 940, including an operating system 945 and/or other code 950, such as an application program (which may be a client application, web browser, mid-tier application, RDBMS, etc.). It should be appreciated that alternate embodiments of a computer system 900 may have numerous variations from that described above. For example, customized hardware might also be used and/or particular elements might be implemented in hardware, software (including portable software, such as applets), or both. Further, connection to other computing devices such as network input/output devices may be employed. Software of computer system 900 may include code 950 for implementing embodiments of the present invention as described herein.

Each of the methods described herein may be implemented by a computer system, such as computer system 900 in FIG. 9. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed by the computer without human intervention. Therefore, it will be understood in light of this disclosure, that each step and each method described herein may be altered to include an input and output to and from a user, or may be done automatically by a computer system.

Furthermore, some embodiments of each of the methods described herein may be implemented as a set of instructions stored on a tangible, non-transitory storage medium to form a tangible software product.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method comprising:
   receiving a plurality of objects from a pre-rendering process of a 3-D virtual scene, wherein the plurality of objects is arranged in a scene-graph hierarchy;
   generating a plurality of identifiers for the plurality of objects, wherein the plurality of identifiers comprises a first identifier for a first object in the plurality of objects, wherein the identifier is generated based on a position of the first object in the scene-graph hierarchy;
   performing a rendering operation on the plurality of objects to generate a deep image, wherein the deep image comprises a plurality of samples that correspond to the first object; and
   propagating the plurality of identifiers through the rendering operation such that each of the plurality of samples in the deep image that correspond to the first object are associated with the identifier and with a rendered color;
   exporting the scene-graph hierarchy from the pre-rendering process to a post-rendering process;
   receiving a selection of the first object from the scene-graph hierarchy in the post-rendering process;
   selecting the plurality of samples that correspond to the first object from the deep image by identifying samples in the deep image that are associated with the first identifier; and
   performing a post-render operation on the plurality of samples in the deep image that correspond to the first object.

2. The method of claim 1, wherein the post-render operation comprises generating a matte image.

3. The method of claim 1, wherein:
   the identifier comprises a bit field divided into a plurality of partitions; and
   each of the plurality of partitions is associated with a different level in the scene-graph hierarchy.

4. The method of claim 3, wherein:
   the plurality of partitions comprises a first partition associated with an instance of the first object; and
   the plurality of partitions comprises a second partition associated with a parent of the first object.

5. The method of claim 1, further comprising:
   receiving a selection of the first identifier after performing the rendering operation;
   determining one or more identifiers associated with parent objects of the first object in the scene-graph hierarchy; and
   selecting one or more samples in the deep image that are associated with the one or more identifiers.

6. The method of claim 1, wherein generating the plurality of identifiers for the plurality of objects comprises:
   using a hash function on the first object to generate a number;
   determining a number of bits to be used to represent the number, wherein the number of bits is based on a number of objects in the plurality of objects; and
   representing the number using the determined number of bits in the identifier.

7. A system comprising:
   one or more processors; and
   one or more memory devices having instructions stored thereon that, when executed by the one or more processors, cause the one or more processors to perform operations comprising:
   receiving a plurality of objects from a pre-rendering process of a 3-D virtual scene, wherein the plurality of objects is arranged in a scene-graph hierarchy;
   generating a plurality of identifiers for the plurality of objects, wherein the plurality of identifiers comprises a first identifier for a first object in the plurality of objects, wherein the identifier is generated based on a position of the first object in the scene-graph hierarchy;
   performing a rendering operation on the plurality of objects to generate a deep image, wherein the deep image comprises a plurality of samples that correspond to the first object; and
   propagating the plurality of identifiers through the rendering operation such that each of the plurality of samples in the deep image that correspond to the first object are associated with the identifier and with a rendered color;
   exporting the scene-graph hierarchy from the pre-rendering process to a post-rendering process;
   receiving a selection of the first object from the scene-graph hierarchy in the post-rendering process;
   selecting the plurality of samples that correspond to the first object from the deep image by identifying samples in the deep image that are associated with the first identifier; and
   performing a post-render operation on the plurality of samples in the deep image that correspond to the first object.

8. The system of claim 7, wherein:
   the identifier comprises a bit field divided into a plurality of partitions; and
   each of the plurality of partitions is associated with a different level in the scene-graph hierarchy.

9. The system of claim 8, wherein:
   the plurality of partitions comprises a first partition associated with an instance of the first object; and
   the plurality of partitions comprises a second partition associated with a parent of the first object.

10. The system of claim 7, wherein the instructions, when executed by the one or more processors, cause the one or more processors to perform additional operations comprising:
   receiving a selection of the first identifier after performing the rendering operation;

determining one or more identifiers associated with parent objects of the first object in the scene-graph hierarchy; and selecting one or more samples in the deep image that are associated with the one or more identifiers.

11. The system of claim 7, wherein generating the plurality of identifiers for the plurality of objects comprises:

using a hash function on the first object to generate a number;

determining a number of bits to be used to represent the number, wherein the number of bits is based on a number of objects in the plurality of objects; and representing the number using the determined number of bits in the identifier.

12. A non-transitory computer-readable medium comprising instructions that, when executed by one or more processors, cause the one or more processors to perform operations comprising:

receiving a plurality of objects from a pre-rendering process of a 3-D virtual scene, wherein the plurality of objects is arranged in a scene-graph hierarchy;

generating a plurality of identifiers for the plurality of objects, wherein the plurality of identifiers comprises a first identifier for a first object in the plurality of objects, wherein the identifier is generated based on a position of the first object in the scene-graph hierarchy;

performing a rendering operation on the plurality of objects to generate a deep image, wherein the deep image comprises a plurality of samples that correspond to the first object; and propagating the plurality of identifiers through the rendering operation such that each of the plurality of samples in the deep image that correspond to the first object are associated with the identifier and with a rendered color;

exporting the scene-graph hierarchy from the pre-rendering process to a post-rendering process;

receiving a selection of the first object from the scene-graph hierarchy in the post-rendering process;

selecting the plurality of samples that correspond to the first object from the deep image by identifying samples in the deep image that are associated with the first identifier; and performing a post-render operation on the plurality of samples in the deep image that correspond to the first object.

13. The non-transitory computer-readable medium of claim 12, wherein:

the identifier comprises a bit field divided into a plurality of partitions;

each of the plurality of partitions is associated with a different level in the scene-graph hierarchy the plurality of partitions comprises a first partition associated with an instance of the first object; and the plurality of partitions comprises a second partition associated with a parent of the first object.

14. The non-transitory computer-readable medium of claim 12, wherein the instructions, when executed by the one or more processors, cause the one or more processors to perform additional operations comprising:

receiving a selection of the first identifier after performing the rendering operation;

determining one or more identifiers associated with parent objects of the first object in the scene-graph hierarchy; and selecting one or more samples in the deep image that are associated with the one or more identifiers.

15. The non-transitory computer-readable medium of claim 12, wherein generating the plurality of identifiers for the plurality of objects comprises:

using a hash function on the first object to generate a number;

determining a number of bits to be used to represent the number, wherein the number of bits is based on a number of objects in the plurality of objects; and representing the number using the determined number of bits in the identifier.

* * * * *

UNITED STATES PATENT AND TRADEMARK OFFICE
CERTIFICATE OF CORRECTION

PATENT NO. : 9,704,290 B2
APPLICATION NO. : 14/502439
DATED : July 11, 2017
INVENTOR(S) : Shijun Haw and Xavier Bernasconi Page 1 of 1

It is certified that error appears in the above-identified patent and that said Letters Patent is hereby corrected as shown below:

On the Title Page

Item (71), subsection Applicant:
Replace "LUCASFILM ENTERTAINMENT COMPANY, LTD., San Francisco, CA (US)" with
--LUCASFILM ENTERTAINMENT COMPANY LTD., San Francisco, CA (US)--

In the Claims

Column 20, Claim 13, Line 6:
Replace "different level in the scene-graph hierarchy" with --different level in the scene-graph hierarchy;--

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*